R. T. Crane,
Steam-Boiler Indicator.
N° 67,506.   Patented Aug. 6, 1867.

Witnesses:
L. L. Coburn
W. E. Mann

Inventor:
R. T. Crane

United States Patent Office.

RICHARD T. CRANE, OF CHICAGO, ILLINOIS.

Letters Patent No. 67,506, dated August 6, 1867.

IMPROVEMENT IN LOW-WATER ALARM FOR STEAM-GENERATORS.

*The Schedule referred to in these Letters Patent and making part of the same.*

TO ALL WHOM IT MAY CONCERN:

Be it known that I, RICHARD T. CRANE, of the city of Chicago, in the county of Cook, and State of Illinois, have invented a new and useful Improvement in Low-Water Alarms for Steam-Boilers; and I do hereby declare that the following is a full, clear, and exact description of the same, reference being had to the accompanying drawings and the letters and figures marked thereon, which form a part of this specification, and in which—

Figure 1:
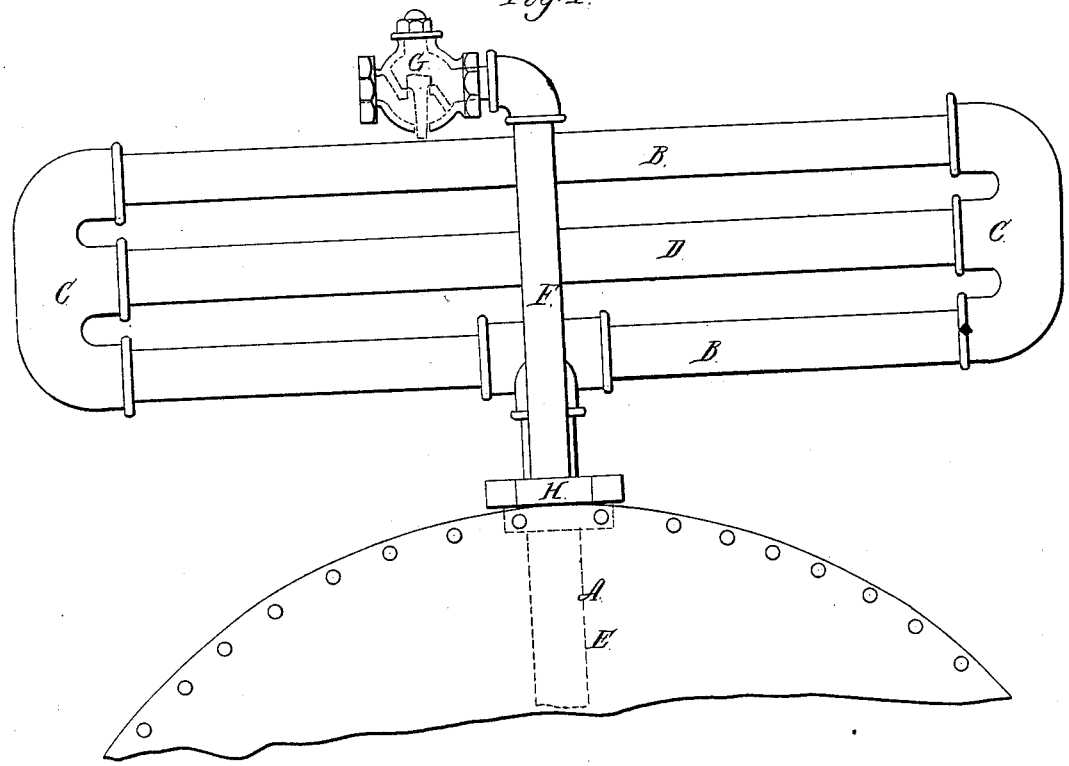
Figure 2:
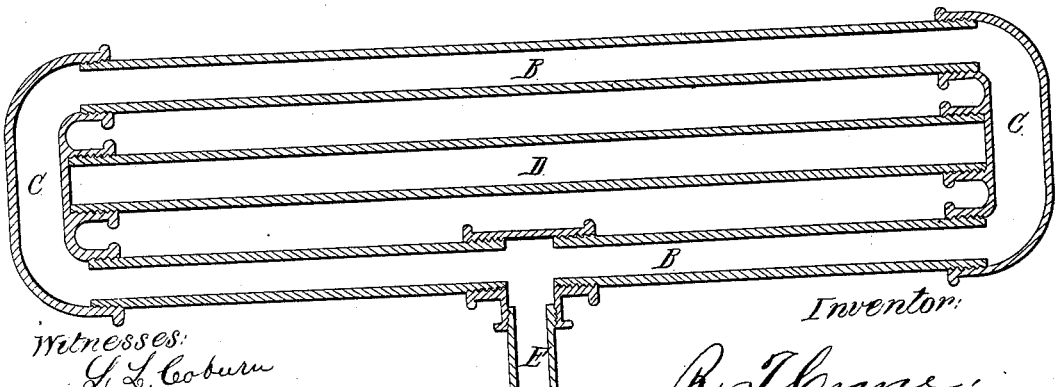

Figure 1 represents a side elevation of my invention as attached to a boiler, and Figure 2 is a vertical sectional view of the pipes A B.

The nature of my invention consists in so constructing and arranging pipe in connection with a boiler that the pipe is full of water till the water in the boiler falls to the low-water mark, when steam passes into the pipe and opens a valve by the expansion of the pipe, and causes steam to escape from the boiler and give an alarm by blowing a whistle or otherwise.

To enable those skilled in the art to manufacture and use my invention, I will proceed to describe the same with particularity.

The same letters of reference refer to the corresponding parts in the different figures.

A represents a boiler, and B B two pieces of pipe connected at each end by the connecting pipes C C. There is also connected to these connecting pipes C C a pipe or bar, D. When a pipe is used there is no opening from the pipes C C into said pipe, so that a solid bar would answer the same purpose, and would accomplish the same object. The pipe E is connected to the pipe B, and extends into the boiler to the low-water mark, or as low as the water should ever be allowed to get in the boiler. There is also a pipe, F, which is attached to the boiler, and extends up past the pipes B, so that the valve G, which is attached to the upper end of the pipe F, is held just over and above said pipe B. H is a plug or nut which is set firmly into the boiler; the pipe E extends through it down to the low-water mark in the boiler, and the pipe F simply extends through it, and opens into the top of the boiler. When the boiler is filled with water above the lower end of the pipe E, and is heated, the pipes E and B are filled with water, but the pipe F is filled with steam, which rests on the top of the valve G and keeps it closed. If at any time the water falls below the lower end of the pipe E, the water is displaced from the pipes B, and they are filled with steam, which heats them to a higher temperature and causes them to expand. The pipe D, not being filled with steam, does not expand, and by not expanding it holds the connecting pipes C firmly in their places, and thereby causes the pipes B to spring out at the centre as they expand. As the pipe B expands and bilges or springs out in its centre it strikes against the stem of the valve G, and raises the valve so as to let the steam escape from the pipe F. This steam, as it escapes, is made by any suitable device to give an alarm by which the engineer will know that the boiler requires water. Instead of a single pipe, E, extending into the boiler from the pipe B, there may be two pipes extending down into the boiler, one extending to the low-water mark and the other a little below, the object being to so arrange the pipes that the steam will pass into the pipes B as soon as the water reaches the low-water mark in the boiler. The stem of the valve G should not rest upon the pipe B, but should be adjusted relatively thereto so that the expansion thereof, caused by the ordinary temperature of the pipes B when filled with water, will not open the valve, but the valve will be opened only when the pipes are more highly heated by the admission of steam, as above described.

Having thus fully described the construction and operation of my invention, I will now specify what I claim, and desire to secure by Letters Patent—

I claim the arrangement of the pipes B B and tie D, with respect to the valve G, substantially as and for the purposes specified.

R. T. CRANE.

Witnesses:
W. E. MARRS,
L. L. COBURN.